May 31, 1949. G. H. RUFLE 2,471,902
ELECTRICALLY ILLUMINATED ADVERTISING DEVICE
Filed Oct. 3, 1946 11 Sheets-Sheet 1

May 31, 1949.  G. H. RUFLE  2,471,902
ELECTRICALLY ILLUMINATED ADVERTISING DEVICE
Filed Oct. 3, 1946  11 Sheets-Sheet 2

FIG.2.

INVENTOR.
GEORGE H. RUFLE
BY
ATTORNEY

May 31, 1949. G. H. RUFLE 2,471,902
ELECTRICALLY ILLUMINATED ADVERTISING DEVICE
Filed Oct. 3, 1946 11 Sheets-Sheet 4

INVENTOR.
GEORGE H. RUFLE
Frederick Griswold, Jr.
ATTORNEY

May 31, 1949.   G. H. RUFLE   2,471,902
ELECTRICALLY ILLUMINATED ADVERTISING DEVICE
Filed Oct. 3, 1946   11 Sheets-Sheet 5

FIG. 7.

INVENTOR.
GEORGE H. RUFLE
Frederick Griswold, Jr.
ATTORNEY

May 31, 1949.	G. H. RUFLE	2,471,902
ELECTRICALLY ILLUMINATED ADVERTISING DEVICE
Filed Oct. 3, 1946	11 Sheets-Sheet 8

FIG.14.

INVENTOR.
GEORGE H. RUFLE
BY
Frederick Griswold, Jr.
ATTORNEY

May 31, 1949. G. H. RUFLE 2,471,902
ELECTRICALLY ILLUMINATED ADVERTISING DEVICE
Filed Oct. 3, 1946 11 Sheets-Sheet 9

INVENTOR.
GEORGE H. RUFLE
BY Frederick Griswold, Jr.
ATTORNEY

May 31, 1949. G. H. RUFLE 2,471,902
ELECTRICALLY ILLUMINATED ADVERTISING DEVICE
Filed Oct. 3, 1946 11 Sheets-Sheet 10

INVENTOR.
GEORGE H. RUFLE
BY
ATTORNEY

May 31, 1949.  G. H. RUFLE  2,471,902
ELECTRICALLY ILLUMINATED ADVERTISING DEVICE
Filed Oct. 3, 1946  11 Sheets-Sheet 11

FIG.22.

INVENTOR.
GEORGE H. RUFLE
BY
Frederick Griswold, Jr.
ATTORNEY

Patented May 31, 1949

2,471,902

UNITED STATES PATENT OFFICE 2,471,902

ELECTRICALLY ILLUMINATED ADVERTISING DEVICE

George H. Rufle, Laurelton, N. Y.

Application October 3, 1946, Serial No. 701,044

4 Claims. (Cl. 177—350)

This invention relates to animated signs of the kind in which a plurality of electrically energized sources of illumination, such as electric lamps, are adapted to be selectively illuminated to depict figures or letters for advertising or amusement purposes.

One object of the invention is an instrumentality by which selected lamps of the sign may be illuminated.

Another object of the invention is to illuminate the lamps of the sign to depict moving figures or indicia.

A further object of the invention is apparatus by which predetermined lamps in a sign may be illuminated in accordance with a preconceived pattern.

It is also an object of the invention to provide what may be considered pattern plates so constructed and arranged as to actuate or energize circuit closing devices controlling the flow of electric current to selected electric lamps, in order to create a design by the illumination of such selected lamps.

Still another object of the invention is to change the color of predetermined light areas controlled by given circuit closing devices.

In my previous Patent 2,210,382, granted August 6, 1940, I disclosed and claimed an animated sign having a plurality of electrical energized sources of illumination, such as lamps, connected with a source of electrical energy in which the lamps are selectively energized by being individually connected with the source of electrical energy by circuit completing devices comprising, for instance, conductive elements whereof portions are made conductive according to a preconceived arrangement or design to correspond to sources of illumination to be rendered operative.

In the attainment of such object, conductive plates were provided whereof the surface was insulated in a predetermined design so that when plates were brought into contact with a bank of circuit closers, such as reciprocating circuit closing rods or plungers, the electrical contact would be effected only by a contact plunger rod or rods or other elements in that area which was free from insulation.

The invention also sought an animated sign which is practical from the standpoint of ease of manufacture, and convenience and practicability in use.

These and other objects of the invention and the means for their attainment will be more apparent from the following detailed description taken in connection with the accompanying drawings illustrating various embodiments by which the invention may be realized, and in which.

In carrying this invention into effect, a sign board has mounted thereon in some convenient fashion a plurality of electrical light bulbs arranged in columns and rows. The light bulbs on the sign can all be of one color or they may be of a multitude of colors arranged in a definite repeating pattern. When the respective bulbs are differently colored respectively, a figure may be created on the sign in which the different areas making up the whole are of different colors. In order to create such a figure from a plurality of colored lights, all lights of one color must be associated with one control means.

Figure 1:
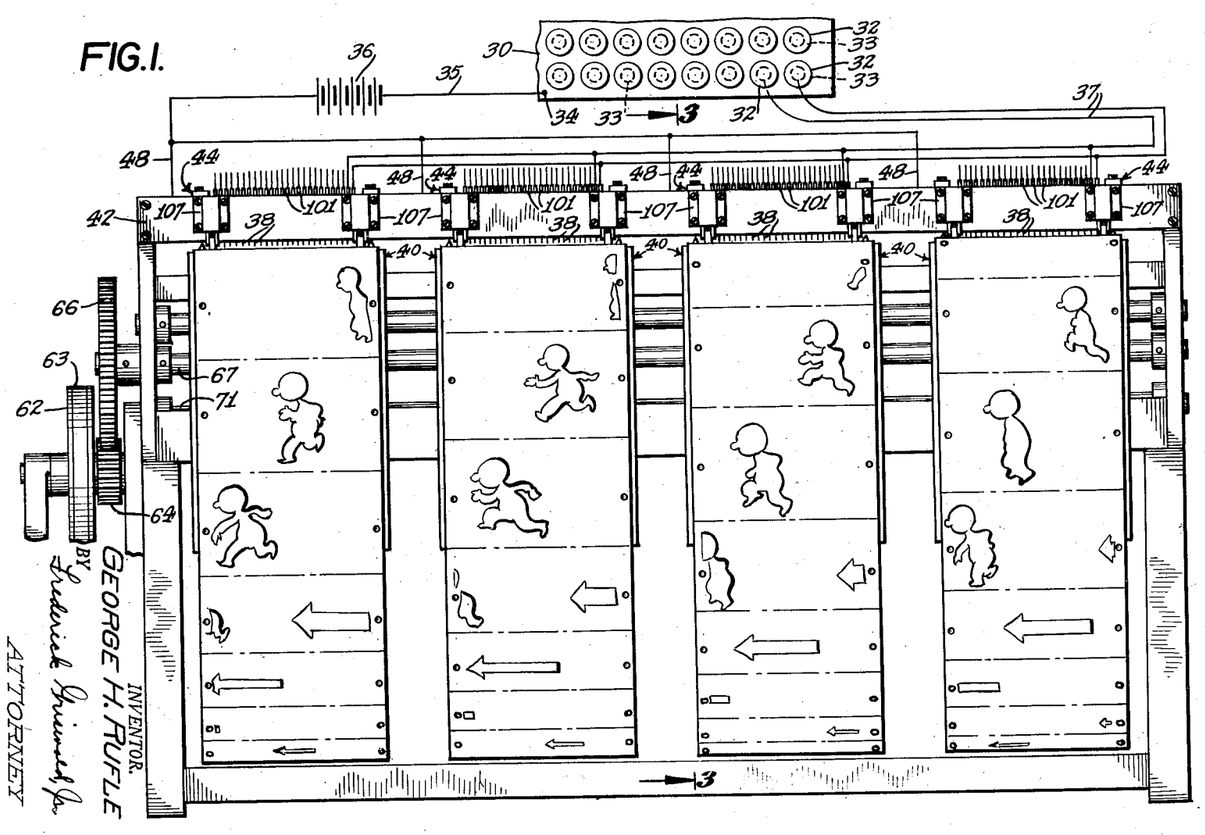
Fig. 1 is a view in front elevation showing a series of circuit closing devices in accordance with this invention and illustrated as energizing a bank of lights.
Figure 14:
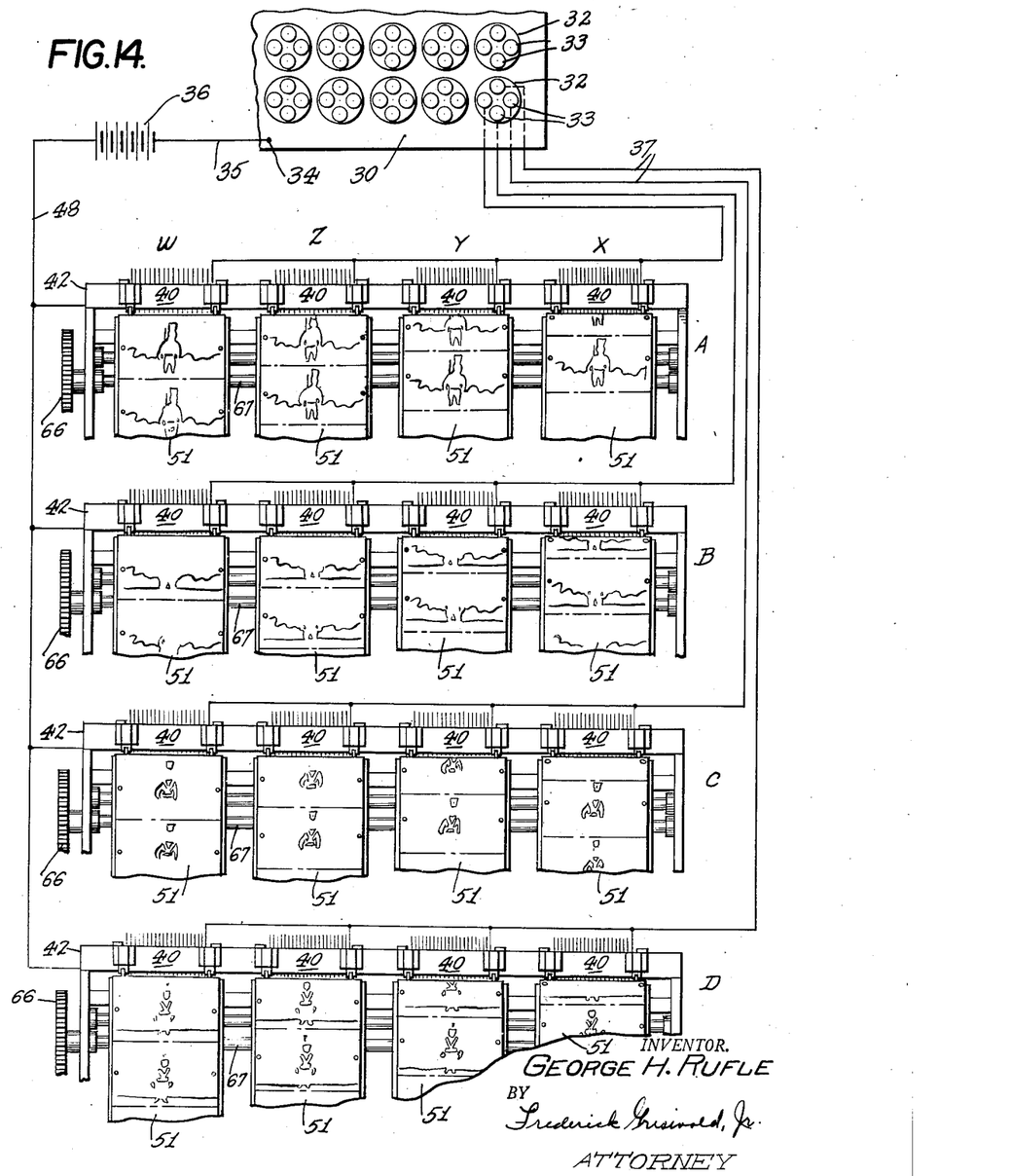
Fig. 14 is a view showing a plurality of banks of circuit closing instrumentalities operatively connected with individual banks of lights whereby changes in the color of specific areas of a sign board may be effected.

Referring first to Fig. 1, a fragmentary portion of a sign board 30 is illustrated which may, for instance, be mounted upon the outside of a building, not shown, and may be of any suitable shape and construction to meet the requirements of a particular location. This sign board 30 has mounted thereon, in some convenient fashion a plurality of sockets 32, each of which is adapted to receive an electrical lamp, not shown. As shown in Figs. 1 and 14, each socket 32 is provided with quadruple contact points 33 severally connected through lines 37 to corresponding sensing pins 38. Preferably, such a sign 30 will be provided with a large number of electrical bulbs arranged in vertical and horizontal rows, as is now the practice in electrical flashing signs and the like, although other arrangements of the sources of illumination are within the purview of this invention. Such a sign 30 may carry as many as 5,000 or more electric light bulbs removably mounted in lamp sockets 32 on the sign. One terminal 34 of all the sockets 32 is connected by a wire 35 to a source of electrical energy, illustrated schematically in Fig. 1 at 36. Each of the terminals 33 of each of the respective lamp sockets 32 is connected by an individual wire 37 to a sensing pin 38 located in one of the circuit operating units 40. In Fig. 1, four such units are shown mounted within a frame 42. The top part of each unit has a table 44 in which is mounted a plurality of sensing pins 38. One such sensing pin is provided for each bulb upon the sign. All sensing pins connected to electric bulbs of one color are grouped together within one table. Therefore, it may be seen, as many circuit closing units 40 as there are different colored bulbs must be provided.

Figures 4, 5, 6:
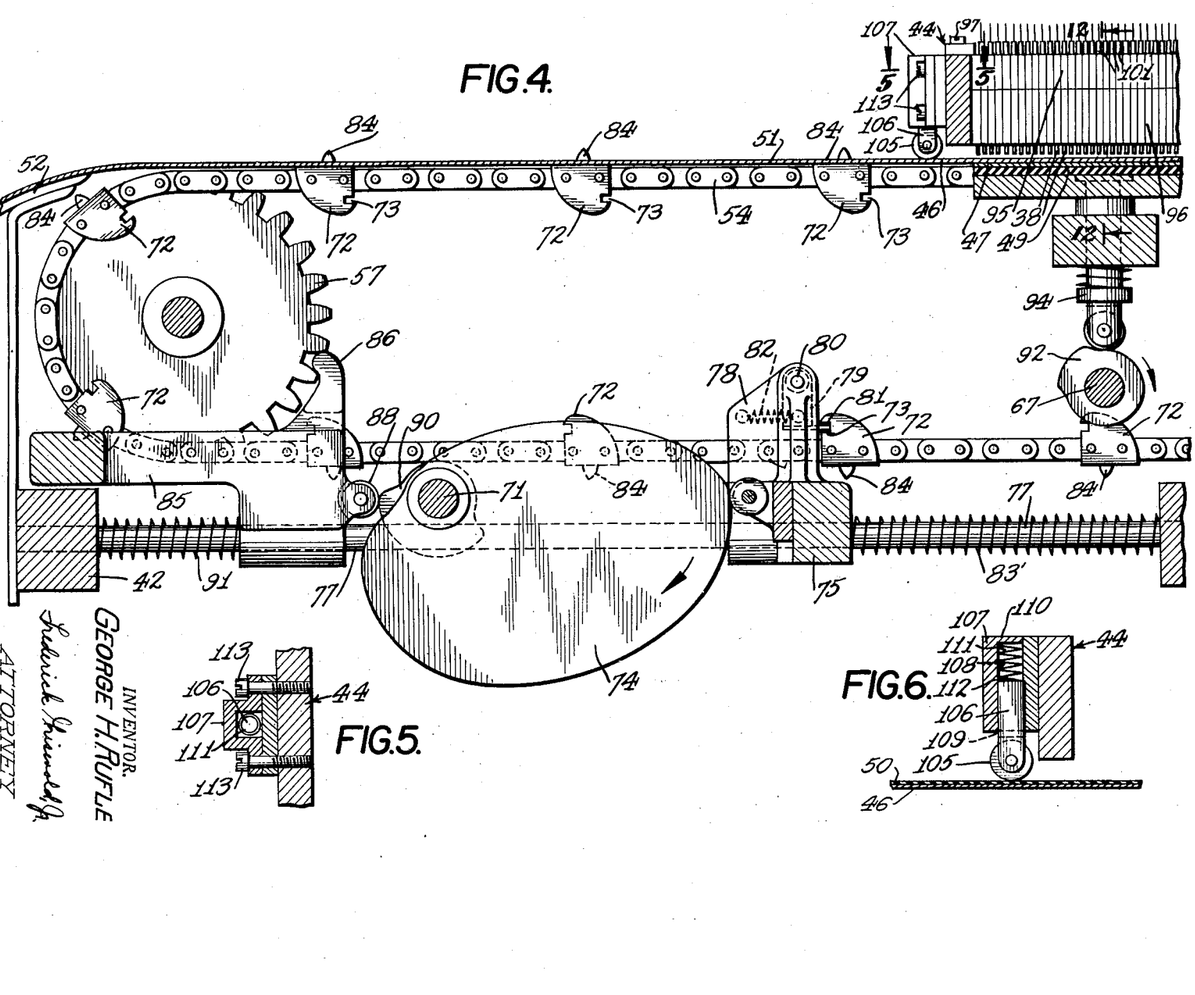
Fig. 4 is a view in side elevation on an enlarged scale showing the structure at the left-hand end of Fig. 3 and the actuation of the circuit closing instrumentalities and the structure by which pattern plates are conveyed and actuated as well as the advancing device at the advanced position.
Fig. 5 is a view in section taken in the plane indicated by the line 5—5 of Fig. 4.
Fig. 6 is a view in vertical section of the structure by which the belt is stripped from the contacts at the completion of a circuit closing operation.

Each circuit closing unit has a conducting plate 46 which travels between the sensing pins and a conducting block 47, see Fig. 4. To complete the electrical circuit the conducting block 47 of each circuit closing unit 40 (Fig. 1) is connected by means of wires 48 to the power source 36.

If portions of the conducting plate 46 are covered with an insulating material, no current can flow through the sensing pins 38 which come in contact with this insulating material, and, therefore, those light bulbs which are associated with those sensing pins 38 separated from the conducting plate 46 by the insulation material will not be illuminated. By conforming the layer of insulation to a pattern, the illuminated sign will reveal this pattern. By arranging a series of conducting plates 46 each with a slightly different pattern, and continually substituting one conducting plate 46 for another between the sensing pins 38 and the conducting plate, in a manner to be described later, the sign will reveal the patterns on the conducting plates and further the pattern on the sign will move or become animated. In order to create a moving figure comprising areas of different colors, the insulating material on the series of conducting plates 46 which are substituted seriatim between the sensing pins 38 and conducting block 47 of the circuit closing units 40 which controls the particular color must likewise be of continually changing outlines.

The conducting plates 46 are joined together to form a continuous, flexible belt 51. This belt 51 is intermittently moved between the group of sensing pins 38 and the conducting block 47 in a manner now to be described. As shown, in Fig. 2, the belt 51 is caused to travel along the runners 52 of the frame 42 by means of chains 54 travelling around sprockets 56, 57 and 58, 59. An electric motor 60 drives a pulley 62 by means of a belt 63. A gear 64 is mounted on the same shaft as pulley 62 and drives a gear 66 mounted on shaft 67. Gear 66 drives an idler gear 68 mounted on a shaft 69. The idler gear 68 drives a second gear 70 mounted on a drive shaft 71. The three gears 66, 68 and 70 are of the same diameter and thereby shaft 71 and shaft 67 turn at the same speed.

Figure 3:
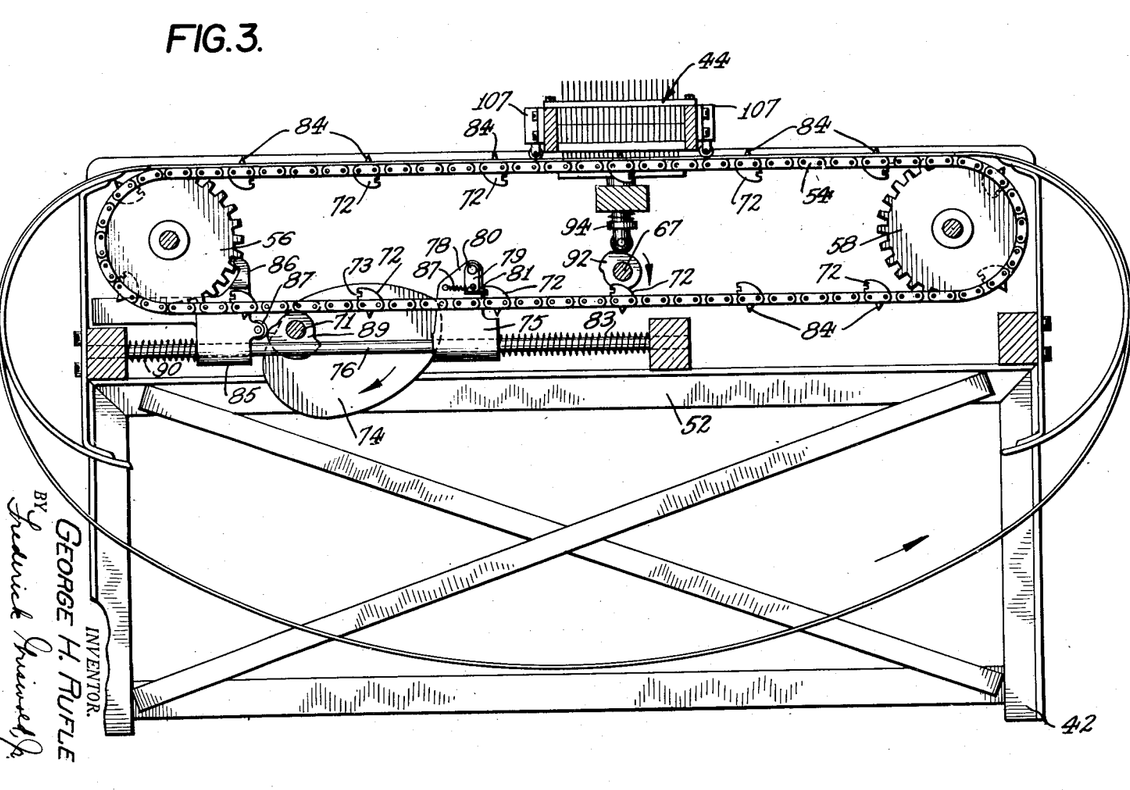
Fig. 3 is a sectional view taken on line 3—3 of Figure 1 and showing details of the mechanism by which the circuit closing pattern plates are moved seriatim to circuit closing position and then moved to make contact with the circuit closing plungers which are electrically connected to the respective lamps of a bank of lights.
Figures 8, 9, 10:
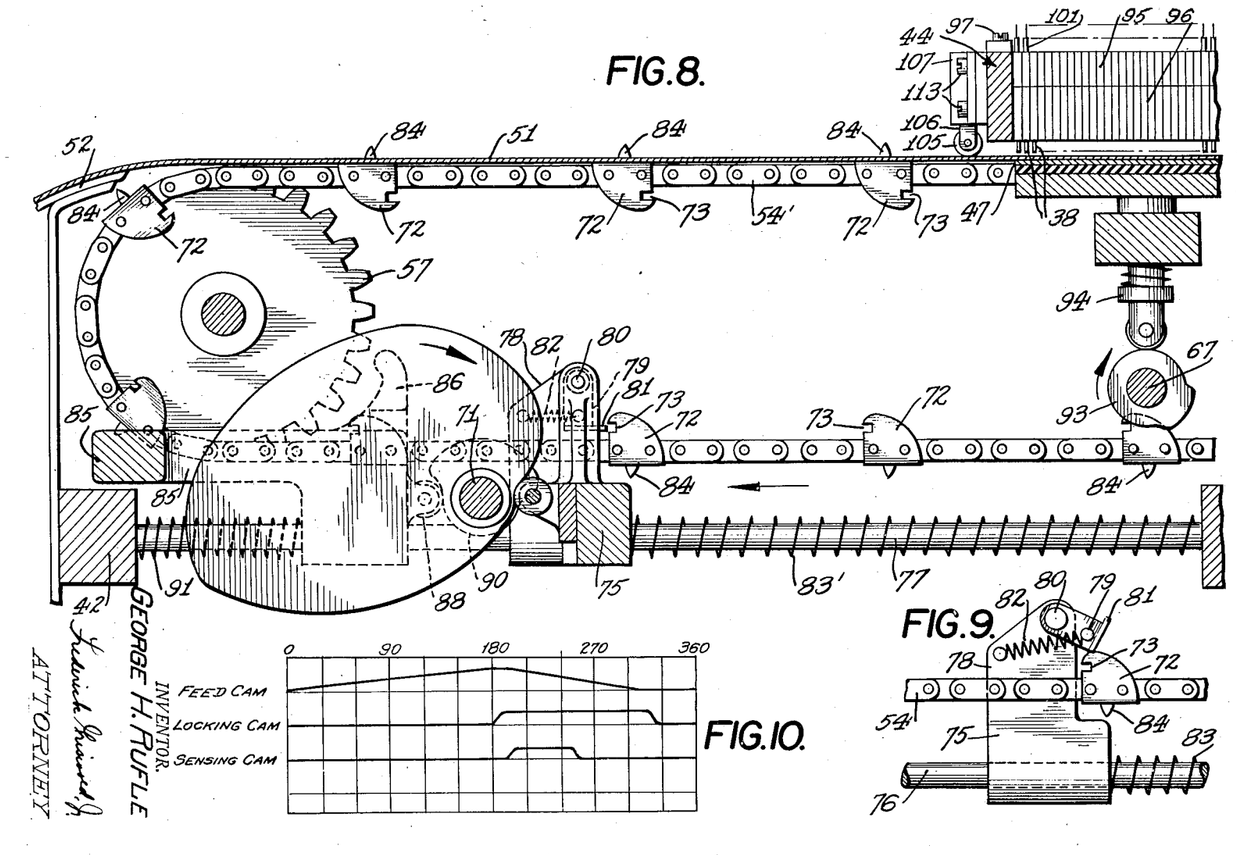
Fig. 8 is an enlarged view, similar to Fig. 4, showing the advancing device in its initial position.
Fig. 9 is a view showing the movement of the advancing device latch in returning to initial position in the return movement of the advancing devices.
Fig. 10 is a timing diagram of the various cams.

Referring now to Figs. 3, 4 and 8, the chains 54 and 54' are provided at spaced intervals with lugs 84 which are adapted to enter registering apertures in the belt 51. The chains 54 and 54' are advanced and thereby the belt 51 is advanced. A feed cam 74 midway between the runners 52 is mounted on the shaft 71 and bears against a reciprocating follower 75 which is mounted on two bars 76 and 77 mounted below and parallel to the runners 52. The follower 75 is pressed against the feed cam 74 by springs 83 and 83'. Arms 78 on follower 75 extend upwardly adjacent the belt-advancing chains 54 and 54' and are provided with pivoted latches comprising levers 79 pivotally mounted at 80. The pivoted lever 79 is provided with a horizontal plate 81 which is spring pressed by spring 82 in the direction of the travel of the chains 54 and which engages a slot 73 in the lug 72 on the chain in order to advance the chain in a step-by-step movement.

As the feed cam 74 rotates on shaft 71, the chain 54 is advanced a distance equal to the thrust of the feed cam 74, this distance corresponding to the distance between the patterns on the belt 51 as shown in Fig. 4. On its return movement, the latch plate 81 is withdrawn from the slot 73 within the lug 72 and rides over the next lug 72 behind the one with which it was last engaged, in a manner as shown in Fig. 9. The chain-advancing member having travelled this distance backwardly, engages the lug 72 on the chain 54 immediately therebehind, so that on the next revolution of the feed cam 74 the belt will be advanced one step further.

A lock is provided whereby the chains 54 and 54' are held in fixed position for the period of time during which the circuits are closed, and to this end, latches 86 are urged into engagement between the teeth of the sprockets 56 and 57 thereby locking the sprockets and the chain against movement during the circuit-closing operation.

Figure 7:
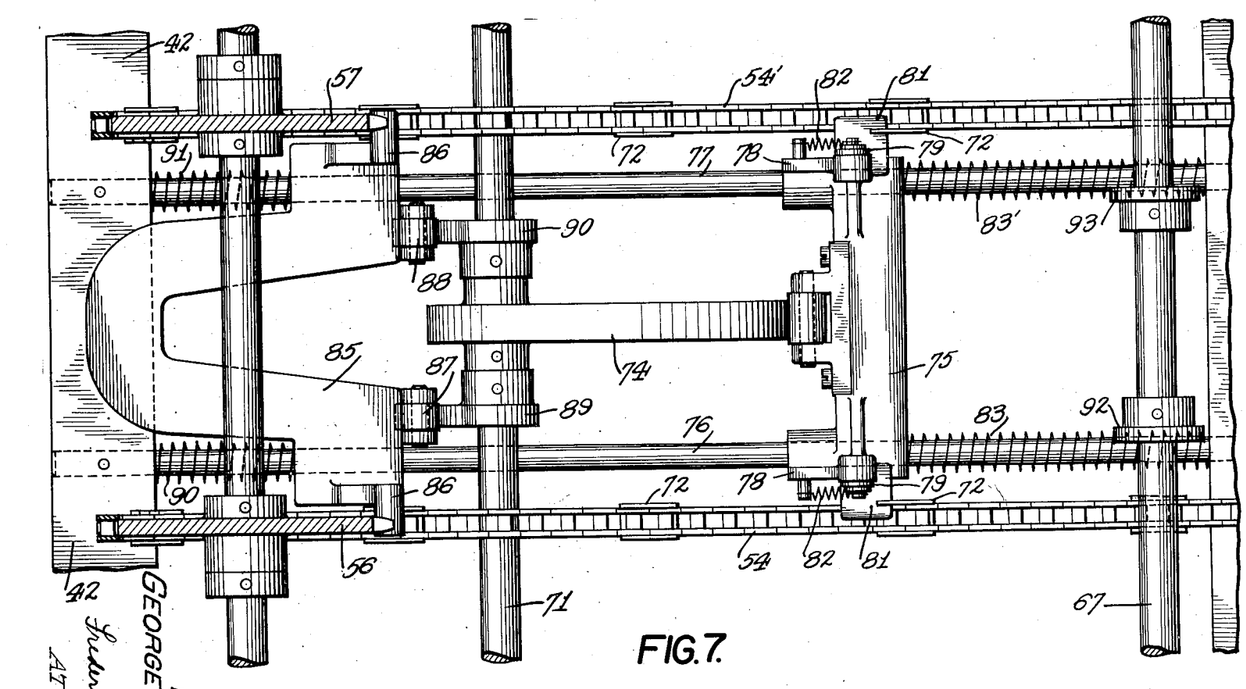
Fig. 7 is a plan view showing the plate advancing instrumentalities in their return to initial position.

As shown in Fig. 7 the locking device comprises a V-shaped cross-head 85 slidably mounted on the same two bars 76 and 77 on which is mounted the chain-advancing means. On either side of this cross-head 85 two lugs 86 are adapted to engage the teeth of the two sprockets 56 and 57, and thereby locking the sprockets. Two rollers 87 and 88 affixed to the cross-head 85 are adapted to ride against two like cams 89, 90 turning on the shaft 71. The cross-head 85 is provided with two springs 91, 91' acting against the frame 42 which forces the cross-head against the cams 89 and 90. Thus as shaft 71 turns, the cross-head 85 will reciprocate, engaging and disengaging the two sprockets 56 and 57. This reciprocating cross-head is formed in a V-shape in order to provide clearance for the feed cam 74 as it rotates.

Referring again to Figs. 3, 4 and 8, in order to prevent the plate changing operation to register on the sign, a means is provided to break the electrical circuit during movement of the belt 54. The circuit-breaking is performed by lowering the insulated block 49 which supports the conducting block 47 and thereby lowering the conducting plate 46 or belt 51 thus severing contact between the conducting plate 46 and the sensing pins 38. As shown, the shaft 67 carries two cams 92 and 93 which rotate in a clockwise direction, as viewed in Fig. 3, and the cams 92 and 93 cause a follower 94 to be lowered and raised. The follower 94, when lowered, lowers the conducting block 47 and thereby breaks the circuit. The cams 92 and 93 are so timed as to lower the conducting block 47 during the plate changing operation and raising it again when the chains 54 and 54' have carried the next plate or pattern into position.

Fig. 10 is an illustration showing the timing diagram of the feed cam, the locking cams and the sensing cams. This diagram illustrates the relative movement of the respective followers. In this chart the distance moved by the follower is plotted against the degrees of revolution of the cam. Referring first to the curve indicated for the feed cam, it will be noted that during the first 180° of revolution, the cam continually advances the follower and that during the subsequent 75° of turn of this cam, the chain-advancing instrumentalities 75 are returned to their initial position and remain there for the remainder of the 360°, that is, the subsequent 60°. The curve representing the locking cams shows that the cross-head 85 remains stationary during the first 180° turn of the locking cams 89 and 90 and the feed cam 74. That is, the lugs 86 and 86' on the cross-head do not engage the sprockets 56 and 57 while the chains 54 and 54' are being advanced. When the chains 54 and 54' have been advanced by the chain-advancing instrumentality 75 to its fullest extent by the action of the feed cam 74, the locking cams force the cross-head 85 away from the shaft 71, the catch on the cross-head engaging the sprockets 56 and 57 and locking them. The sprockets 56 and 57 remain locked by the cross-head remaining in its position most remote from the shaft 71 until the chain-advancing instrumentalities 75 have been returned by the feed cam 74 to their initial position, the latch 84 on the chain-advancing instrumentalities having passed over and engaged the next succeeding lug 72 on the chains. The sensing cam curve shows that the conducting block 47 is raised to complete the circuit between the sensing pins 38 and the belt 51 several moments after or 15° after the chains 54 and 54' have been advanced. The circuit remains closed for only the subsequent 60° turn of the sensing cams 92 and 93 after which time the circuit is again broken and the conducting block 47 is again lowered. Whereas the high portion of the sensing cams are shown as comprising 60°, the high portion of these cams can continue for as much as 90'. When more than one circuit control unit controls one particular color area (see Fig. 14) enough time must elapse between the opening of the circuit in one circuit control unit and the closing of the circuit in another circuit control unit to allow for the after glow of the bulbs.

Figure 2:
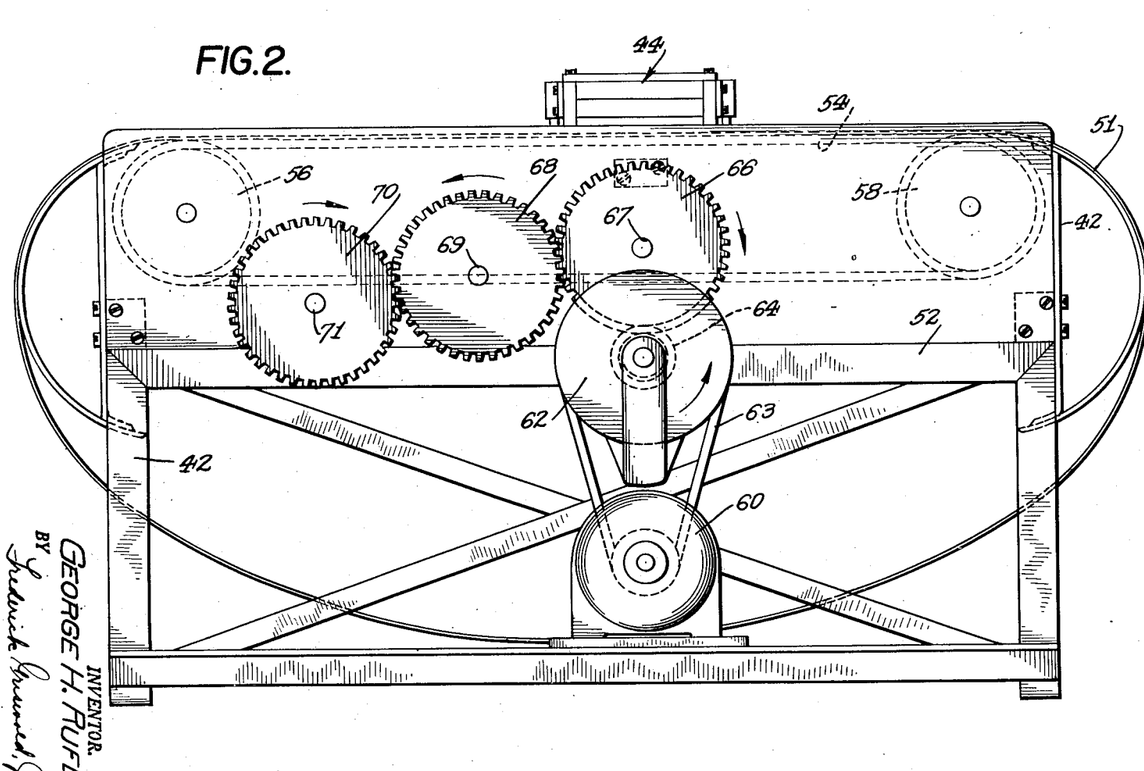
Fig. 2 is a view looking from the left in Fig. 1 and showing the apparatus by which pattern plates are conveyed to the position at which they make contact with circuit closing devices so as to control a bank or banks of lights.
Figure 11:
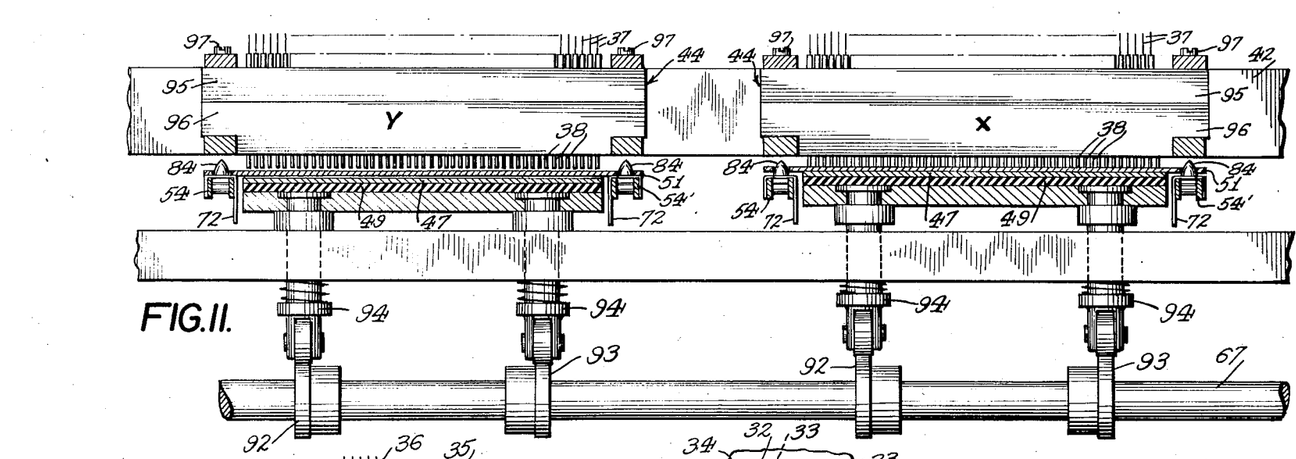
Fig. 11 is a view in front elevation, on an enlarged scale, showing, in detail, two circuit closing instrumentalities of the structure illustrated in Fig. 1 wherein the bank of contacts at the right-hand side of the figure shows the position of the structure in the up or closed circuit position and the bank of contacts at the left-hand side of the figure shows the position of the structure in the down or open circuit position.
Figures 12, 13:
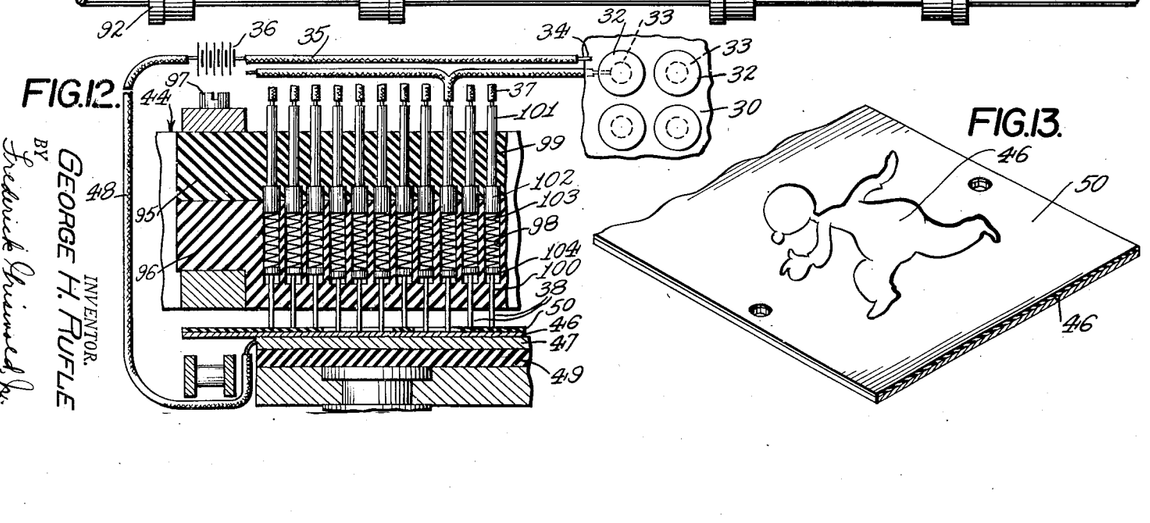
Fig. 12 is a transverse sectional view taken in the plane indicated by the line 12—12 of Fig. 4 showing details of the circuit closing contacts and accessory parts in circuit closed position.
Fig. 13 is a perspective view showing one of the circuit closing contact plates of this invention whereof the area of the figure represents the exposed or electrically conductive area.
Figure 22:
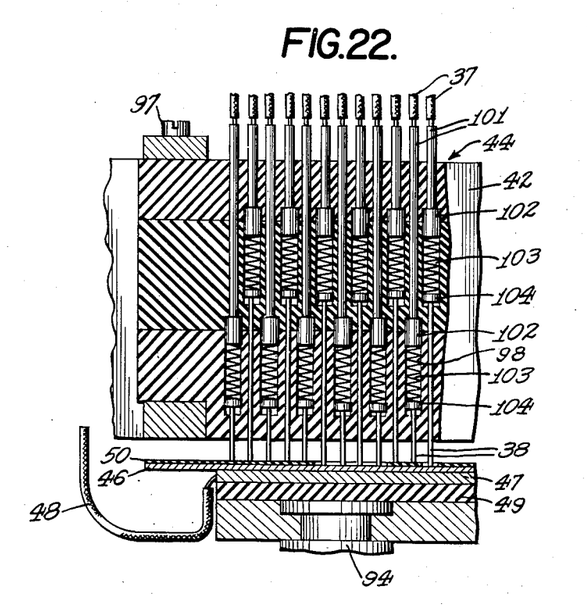
Fig. 22 is a transverse section of the table similar to Fig. 12 in which an alternate means by which the sensing pins may be mounted so as to include more sensing pins per unit area is shown.

In Figs. 11 and 12, the detail construction of the sensing pins is illustrated. The table 44 is shown comprising two rectangular blocks 95 and 96 made of insulating material superimposed one upon the other and held together by bolts as at 97. A plurality of bores or cavities 98 is located within the blocks whereof the lower portion 100 and the upper portion 99 of the passages are of a smaller diameter. Plungers 101 formed with heads 102 of larger diameter fit within each bore, as shown in Fig. 12. Wires leading from sockets 32 are connected to the stationary plungers 101. The sensing pins 38 formed with enlarged heads 104 are carried within the lower passage 99 as shown in Fig. 12. Springs 103 maintain the plungers or sensing finger heads 104 at the lowermost part of the bores 98. Whereas the springs are shown terminating in common planes, it can be seen that by staggering the springs as shown in Fig. 22, more sensing pins may be included per unit area of the table. To insure that the belt 51 remains flat upon runners 52, rollers 105, as shown in Figs. 2, 4 and 8, are placed at the four corners of the table 44. The rollers 105 are respectively mounted on shafts 106 which are spring mounted in a block 107. Block 107 is formed with a bore 108 open at the bottom as at 109 and closed at the top as at 110. Block 107 is secured to the table 44 by means of bolts 113. The spring 111 is mounted between the top 112 of the shaft 106 and the top 110 of the block, and is mounted such that the roller has vertical play and can accommodate belts 51 of various thicknesses.

The conducting plate 46, shown in Figs. 12 and 13, is provided with a layer of insulation 50 on its upper surface. It is to be noted that as shown in Fig. 12, the sensing pins 38, reciprocating within the bores 98 and 99, raise to accommodate the insulating material or lower to make contact with the conducting plate.

As stated before, in order to make a figure on the sign 30 appear animated, a separate circuit controlling unit 40 is required for each color area. In order to make the animation of the sign 30 more life-like, it has been found that several circuit closing units 40 are required for each color area, each circuit closing unit 40 for the one color area operating successively one after another.

Fig. 14 illustrates the mechanism required to operate a sign comprising banks of four different colors of bulbs 140. Each group of four lamps 140 is mounted behind a translucent disc 142. The banks A, B, C and D control respectively the four groups of colored lights. Each bank is comprised, in this case, of four circuit control units 40, although it is within the scope of the invention to provide more or less than four circuit closing units 40 in any one bank. The banks A, B, C and D are synchronized such that the corresponding circuit control units in each operate simultaneously and such that the combined patterns of the patterns in the respective circuit control units will appear on the sign as a complete and unified composite of the respective patterns. All the circuit control units 40 in one bank have in common the transverse shafts 67, 71, as shown in the fragmentary view of Fig. 11, on which are mounted the separate feed cams 74, sensing cams 92 and 93 and locking cams 89 and 90 for each circuit control unit in one bank. The cams are so positioned on their respective shafts as to successively close the circuits in one circuit control unit 40 and advance the belt 51 in another circuit control unit 40. The circuit is closed in one circuit control unit X as the preceding unit opens the circuit. As shown in Fig. 11 the conducting block 47 is up and the circuit is thereby closed in unit X, while in unit Y the conducting block 47 is down and the circuit is therefore open. The four banks, A, B, C and D shown in Figure 14 may also be used to control a group of colored frosted lamps in which case the socket 32 would be provided with four contacts, each contact to receive a single lamp of a color. The closing of a circuit in any one of the four banks, A, B, C and D circuit control units 40 would light a lamp of a selected color.

Figure 15:
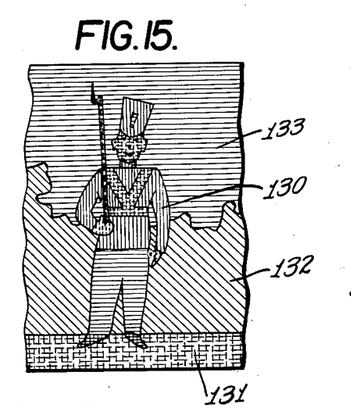
Fig. 15 shows a complete figure comprised of areas of lights of different colors controlled by the apparatus shown in Fig. 14.
Figure 16:
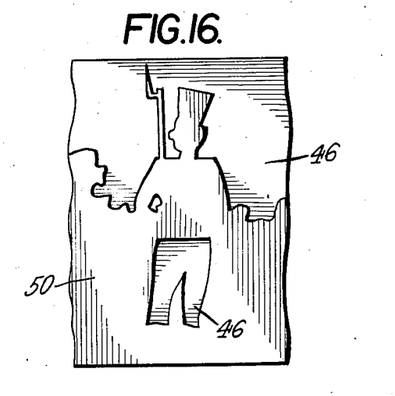
Figs. 16, 17, 18 and 19 show in series the different areas of banks of lights selectively illuminated in different colors whereby the complete illustration of Fig. 16 is attained.
Figure 17:
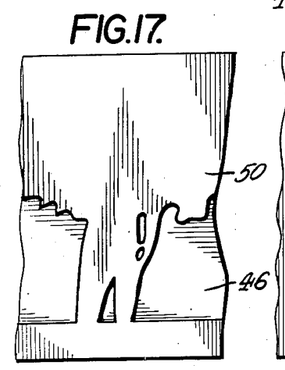
Figure 18:
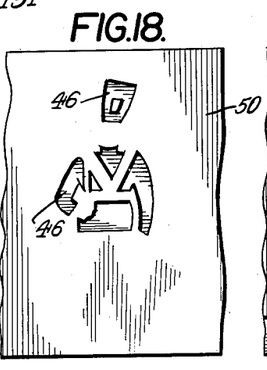
Figure 19:
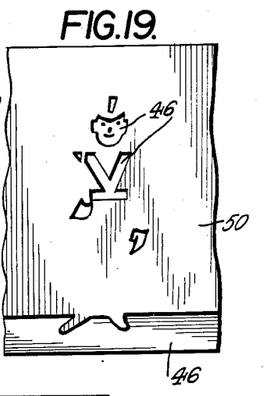

The insulated patterns on the belts employed in each unit are successively different in outline and so arranged to properly change the outline of the color area on the sign and so present a smooth or life-like movement. In Fig. 15, there is illustrated a possible figure which could be made to appear on the sign. It is shown as comprising four color areas, as illustrated, red 130, white 131, green 132, blue 133. Fig. 16 is an illustration showing the outline of the insulating material 50 on the conducting plate in the blue circuit control unit and Fig. 17, the green, Fig. 18, the red and Fig. 19, the white. Whereas only four colors are illustrated, it is apparent that a chosen area may be colored black by lighting none of the bulbs in the chosen area, and, further, by lighting simultaneously bulbs of respectively different colors within a chosen translucent area other colors may be created. Red and white, for instance, will produce a pink tint. By substituting successive variations of each of these patterns in the proper banks of control units of Fig. 14 the figure of Fig. 15 will appear to be alive. As illustrated in Fig. 14, the four belts in color bank A are in progressively different stages in their progress through the control units and the patterns on any one belt are in this instance, successive fourth outlines of the moving color area. Obviously, in a bank comprising more or less than four circuit control units, each belt in that bank will be comprised of more or less than every fourth successive outline of the moving color area.

Figure 20:
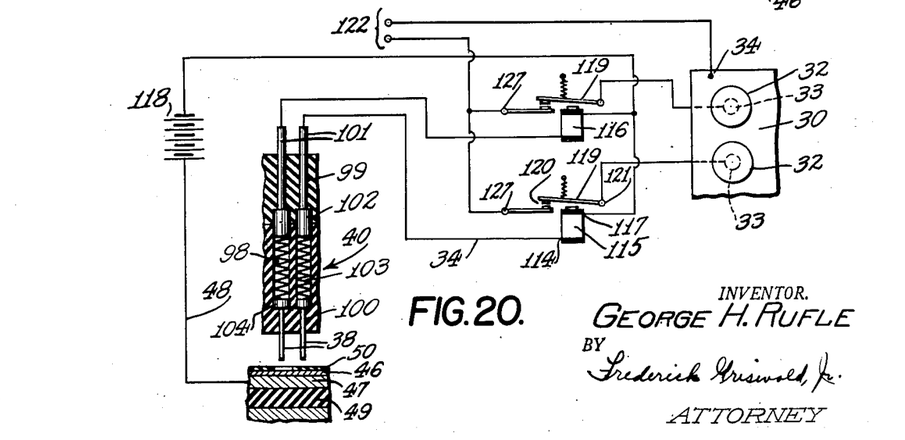
Fig. 20 is a diagrammatic view of the electrical connections whereby the lights of the animated sign are lighted.

As shown in Fig. 20, the current flowing through the sensing pins 38 need not necessarily flow through the light bulbs, not shown, in sockets 32. The sensing pin 38 is shown electrically connected at 114 to the electromagnet 115 of a relay 116. The other terminal of the electromagnet 117 is electrically connected to an electric power source 118. The other side of the power source is electrically connected to the aforementioned conducting block 47. One terminal 33 of the light bulb socket is connected electrically at 121 to the movable arm 119 of the switch 120 of the relay 116. The other terminal 127 of the switch 120 is connected to the electrical power source 122 to which the other terminal 34 of light bulb socket 32 is also connected. It can be seen, therefore, that the circuit closing unit 40 operating in the same manner as heretofore described will now energize the relay 116 and thereby closing switch 120 which will permit current to flow from the power source 118 through closed switch 120 and the light bulb in socket 32 and thereby illuminate the bulb. It is to be recognized that there must be the same number of relays as there are light bulbs on the sign and the same number of sensing pins as relays.

Figure 21:
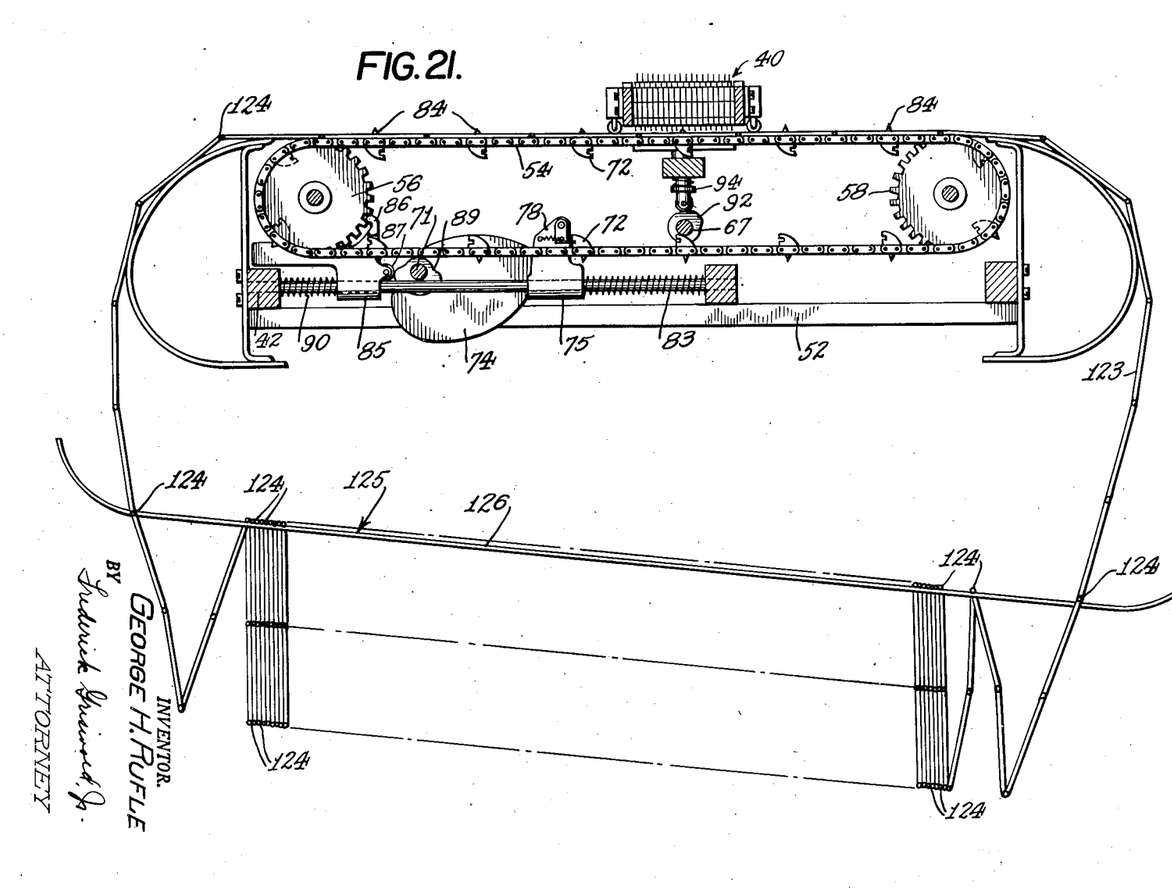
Fig. 21 is a view showing a means by which a long chain or belt made up of the plates shown in Figs. 16-19 is conveyed from one end of the apparatus of this invention to the other end where the plates start through the apparatus.

Whereas the belt 51 has heretofore been referred to as being flexible, it is also possible to construct the belt of stiff plates hinged one to another to form a continuous belt 123 as shown in Fig. 21. At spaced intervals, the shaft 124 to which the plates are hinged extends laterally beyond the lateral edges of the plates 46. A belt of this type is fed in the same manner through the circuit closing unit 40, as heretofore described. However, below the unit 40 in which such a belt comprising hinged plates is used, a rack 125 is provided on which the belt 123 is folded and supported and moved by gravity from the rear to the front of the unit 40 for return through the unit. (In Fig. 21 the rear of the unit is at the left and the front of the unit is at the right.) The carriage 125 comprises two parallel bars 126 sloping from the rear of the unit to the front. Thus it can be seen that the extending hinge shafts 124 will rest upon the carriage bars 126 and the plates will hang to form a stack which is continually moving downward, the plates being stacked at the rear and withdrawn from the stack at the front.

Various modifications will occur to those skilled in the art in the composition, configuration and disposition of the component elements going to make up the invention as a whole as well as in the selection and combination of particular features for specific purposes, and no limitation is intended by the phraseology in the foregoing description or illustrations in the accompanying drawings except as indicated in the appended claims.

What is claimed is:

1. A flickerless, illuminated, animated display sign having a display field, said display field comprising a continuous array of separate translucent areas, electric lamp means for separately illuminating each said area, means for preferentially illuminating selected areas of the display field according to a predetermined animation pattern, and including control mechanism comprising a bank of at least two circuit closers, each circuit closer comprising an endless belt of conductive plates, a bank of sensing pins in each circuit closer and arranged in fixed relation to a reciprocating contact plate, each said sensing pin having individual line connections extending to individual lamps in the display field of the electric sign, the corresponding sensing pins of each bank having connections to a single lamp, means for intermittently advancing each belt of plates one plate length between the contact plates and the sensing pins, separate locking means operable by the belt-advancing means to hold a plate in position, means for moving the contact plates and force the so-positioned superjacent belt plates into contact with the banks of sensing pins, masking indicia on each plate defining a completed picture, the said circuit closers respectively carrying sequential image defining masks, and means to progressively actuate plates of the said several circuit closers in predetermined sequence, each successive circuit closer operable to effect circuit closing during the terminal dwell of the immediately preceding circuit closer whereby to effect flickerless animation.

2. Animated sign system according to claim 1, characterized by the fact that each separate translucent area of the display field is illuminated by unitary electric lamp means.

3. Area illuminating means according to claim 1 comprising a plurality of electric lamps.

4. Area illuminating means according to claim 3, characterized by the fact that the lamps are vari-colored.

GEORGE H. RUFLE.

REFERENCES CITED

The following references are of record in the file of this patent:

UNITED STATES PATENTS

| Number | Name | Date |
|---|---|---|
| 622,608 | Cox | Apr. 4, 1899 |
| 1,065,513 | Eubank | June 24, 1913 |
| 1,092,977 | Compos | Apr. 14, 1914 |
| 1,189,419 | Bach | July 4, 1916 |
| 1,203,049 | Recke | Oct. 31, 1916 |
| 1,218,015 | Tarbox | Mar. 6, 1917 |
| 1,222,083 | Dickerson | Apr. 19, 1917 |
| 1,222,093 | Fricke | Apr. 10, 1917 |
| 1,394,565 | Long | Oct. 25, 1921 |
| 1,419,256 | Hammond | June 13, 1922 |
| 1,462,875 | Stoddard | July 24, 1923 |
| 1,490,092 | Centoni | Apr. 15, 1924 |
| 1,835,912 | Sprague | Dec. 8, 1931 |
| 1,961,578 | Bowers | June 5, 1934 |
| 1,965,206 | Tarbox | July 3, 1934 |
| 1,967,150 | Presti | July 17, 1934 |
| 2,210,382 | Rufle | Aug. 6, 1940 |

FOREIGN PATENTS

| Number | Country | Date |
|---|---|---|
| 542,642 | France | May 19, 1922 |
| 568,570 | France | Dec. 24, 1923 |
| 592,487 | France | May 1, 1925 |